United States Patent
Wieczorek

[19]

[11] Patent Number: 5,947,358
[45] Date of Patent: *Sep. 7, 1999

[54] SIDE PULL SECURITY SHADE WITH STORAGE COMPARTMENT

[75] Inventor: Joseph P. Wieczorek, Madison Heights, Mich.

[73] Assignee: Irvin Automotive Products, Inc., Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/827,801

[22] Filed: Apr. 11, 1997

[51] Int. Cl.$^6$ ..................................................... B60R 7/00
[52] U.S. Cl. ......................... 224/543; 224/539; 296/37.16
[58] Field of Search ..................... 224/539–543, 224/400; 190/111; 220/524; 296/37.16, 37.13; 160/127, DIG. 2, 370.22

[56] References Cited

U.S. PATENT DOCUMENTS

| | | | |
|---|---|---|---|
| 2,398,299 | 4/1946 | Frandsen | 190/111 |
| 4,139,231 | 2/1979 | Lang et al. | |
| 4,168,094 | 9/1979 | Yagi | |
| 4,277,097 | 7/1981 | Lalanne | 296/37.16 |
| 4,536,025 | 8/1985 | Yamawaki et al. | |
| 4,596,418 | 6/1986 | Koh | |
| 4,776,625 | 10/1988 | Lobanoff et al. | 296/37.16 |
| 4,783,113 | 11/1988 | Padlo | |
| 4,927,200 | 5/1990 | Wilkins | |
| 5,213,387 | 5/1993 | Decker et al. | |
| 5,547,187 | 8/1996 | Spykerman | 296/37.16 |
| 5,632,520 | 5/1997 | Butz | 296/37.16 |
| 5,685,592 | 11/1997 | Heinz | 296/37.16 |

FOREIGN PATENT DOCUMENTS 258823  3/1988  European Pat. Off. ............ 296/37.16

*Primary Examiner*—Gregory M. Vidovich
*Attorney, Agent, or Firm*—Dinnin & Dunn, P.C.

[57] ABSTRACT

A security shade for a rear cargo area of a motor vehicle. The security shade comprises a roller tube onto which a flexible shade panel is wound. A cover covers the shade panel and includes portions defining a slot through which the shade panel is extendable and retractable. A storage compartment is adjacent to and integral with the cover. The storage compartment includes an internal chamber that is defined by side walls, end walls, a bottom wall and a top which is moveable between a closed position and an open position permitting access into the chamber.

12 Claims, 2 Drawing Sheets

SIDE PULL SECURITY SHADE WITH STORAGE COMPARTMENT

BACKGROUND OF THE INVENTION

1. Field of the Invention

This invention relates generally to a security shade for the rear cargo area of a motor vehicle. More particularly, the invention relates to a side pull security shade with an integral storage compartment outboard of the shade panel.

2. Background Information

Motor vehicles such as sport vehicles and station wagons include a rear cargo area which is generally bounded by a passenger seat, two interior side walls and a rear access opening or rear access door. A security shade is typically installed behind the passenger seat so that a retractable shade panel can be extended to cover the cargo area. Alternately, the security shade is installed on a side wall of the cargo area and extends laterally across the cargo area.

The security shade itself generally consist of a flexible, substantially rectangular shade panel and a roller tube upon which the shade panel is wound when retracted. The shade panel is sized to cover the entire rear cargo area so as to screen and cover articles stored in the cargo area from view and reduce the risk of theft.

While security shades generally function well to cover the rear cargo area, security shade designs have their limitations. One major problem with security shade design is access to contents being stored in the cargo area when the shade panel is extended. If access is required, it is generally impossible with a rearward pulling security shade to gain access from the rear seat within the vehicle. Rather, the vehicle must be stopped, the rear access door opened and the shade panel completely retracted. After obtaining the article from the cargo area, the shade panel is re-extended and secured and the rear access door of the vehicle closed. During inclement weather, the individuals must subject themselves to the weather while they obtain access.

For a side pull shade, access is not much easier from within the vehicle. An individual must reach laterally across the cargo area, release and completely retract the shade panel (turning their body 180°), remove the article to be retrieved and then extend and secure the shade panel in its original position. If a spare tire is mounted to one of the side walls in the cargo area, as is often the case in a sport utility vehicle, the process is more complex. In these situations, engagement/disengagement of the extended shade panel may involve the fitting of an attachment mechanism around the tire.

From the above, it can be seen that there exists a need for better access to articles which may be stored in the rear cargo area of the vehicle. As always, there is also a need for additional storage compartments in a vehicle.

Accordingly, an object of the present invention is to provide a security shade that completely covers the rear cargo area of a motor vehicle while readily providing a compartment which may be accessed without requiring retraction of the shade panel.

A further object of the present invention is to provide a security shade having an integral storage compartment.

Another object of the present invention is to provide a cross body or side pull security shade having a storage compartment capable of holding small items that would otherwise be loose and free to roll around within the rear cargo area.

A further object of the present invention is to provide a storage compartment that is designed to accommodate a spare tire mounted within the cargo area while allowing the shade portion of the security shade to be of one construction that is useable in applications either with or without a spare tire mounted therein.

SUMMARY OF THE INVENTION

The above and other objects are satisfied by the side pull security shade of the present invention which integrally incorporates a storage compartment.

The storage compartment is located outboard of the shade portion of the security shade and includes walls that define an interior storage chamber of the storage compartment. A hinged lid permits access and closes the storage compartment. As a result, articles in the storage compartment can be readily accessed without having to retract the security shade.

The storage compartment is constructed to be mounted to the trim of an interior side wall in the rear cargo area. With the pull shade and roller tube located inboard of the storage compartment, the pull shade is positioned and spaced inboard a distance so as to clear a spare tire mounted to a wall within the rear cargo area. With the side pull provided and mounted in this manner, the present invention accommodates the spare tire, while allowing a shade panel of one size and shape to be used in the cargo area regardless of whether a spare tire is mounted in the rear cargo area or not.

Additional objects, benefits and advantages of the present invention will become apparent from the subsequent description of the preferred embodiment and the appended claims, taken in conjunction with the accompanying drawings.

DETAILED DESCRIPTION OF THE PREFERRED EMBODIMENT

Figure 1:
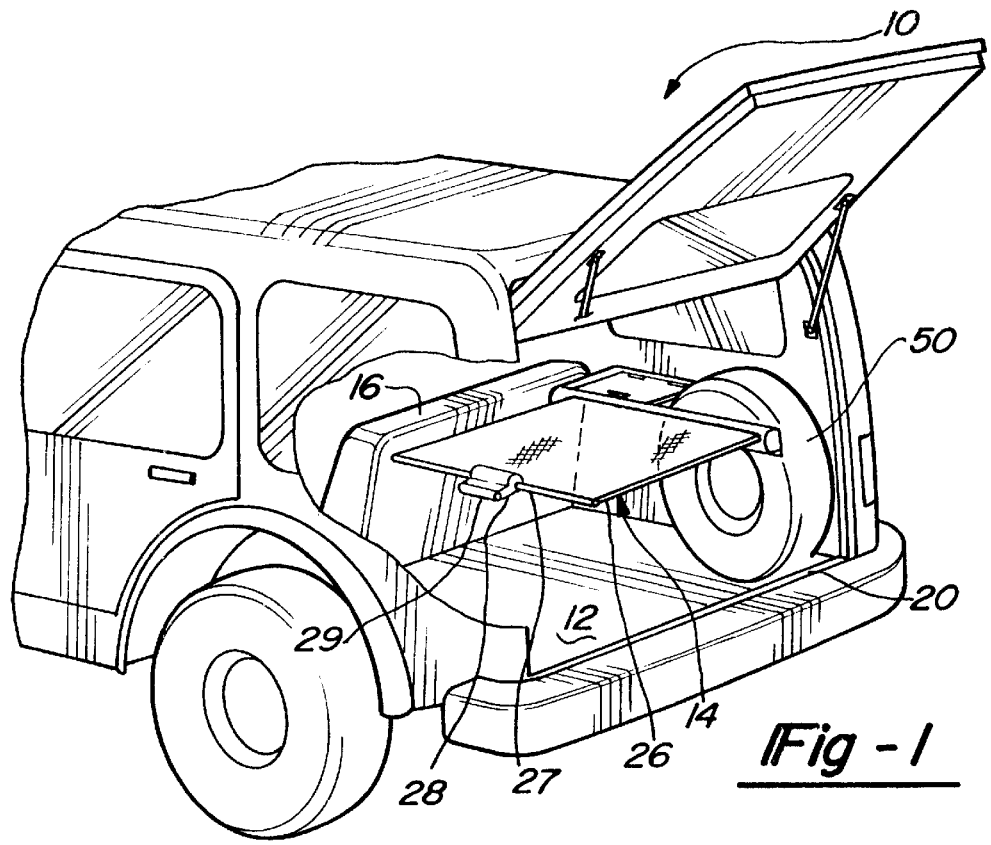
FIG. 1 is a perspective view of a side pull security shade of the present invention located in a rear cargo area of a motor vehicle.
Figure 2:
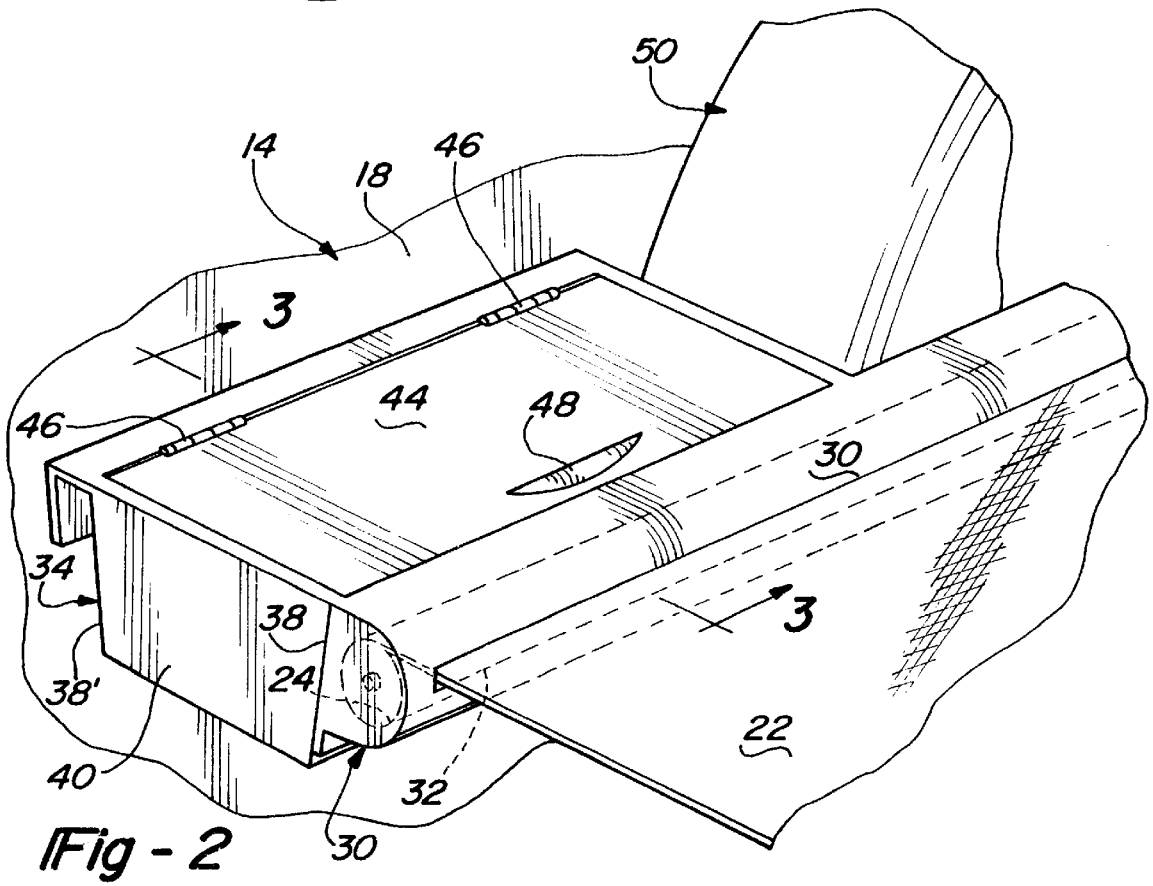
FIG. 2 is an enlarged perspective view of a security shade according to the present invention.
Figure 3:
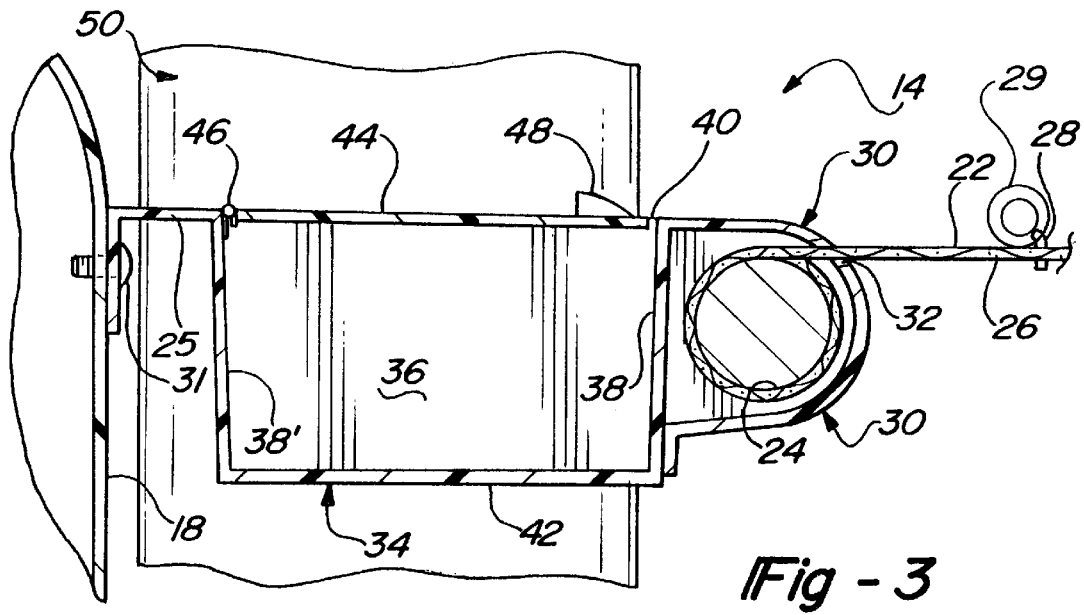
FIG. 3 is a sectional view of the present invention taken generally along line 3—3 in FIG. 2.

Referring now to the figures, FIGS. 1, 2 and 3 generally illustrates a motor vehicle 10 whose rear cargo area 12 is provided with a security shade 14 according to the present invention. Generally, the rear cargo area 12 is bounded at its forward end by a passenger seat 16, at its sides by two lateral side walls 18, and at its rear by a rear access door which closes a rear opening 20.

The security shade 14 of this invention is of the side pull variety. One such security shade is disclosed in U.S. Pat. No. 5,213,387 which is herein incorporated by reference. A major component of the security shade 14 is a flexible shade panel 22, which is wide enough to cover the length of the rear cargo area 12 and long enough to cover the width of the rear cargo area 12. The shade panel 22 is substantially rectangular and made of a thin vinyl or other flexible and durable material. When extended over the rear cargo area 12, the shade panel 22 covers from view articles stowed in the rear cargo area 12.

One end of shade panel 22 is secured or affixed to a roller tube 24 by conventional attaching methods and mechanism. The opposing end 26 of the shade panel 22 preferably includes a pull tube 27 (which rigidifies the end 26) and a handle 28 which includes an attaching clip or ring (not shown). The ring engages or attaches to a corresponding bracket (not shown) on the opposing side wall 18 when the panel 22 is extended. To contract the assembly, the roller tube 24 is provided with an internal, rotational biasing spring which exerts a force that biases or winds the shade panel 22 onto the roller tube 24. The shade panel 22 is held in an extended position by attaching the ring 29 to the side wall 18. The rotational housing spring pulls on the panel to hold it in an extended position. Such mechanisms are well known in the industry and therefore need not be more fully disclosed herein.

In the preferred embodiment, the roller tube 24 with the shade panel 22 are wound thereon, is enclosed within a roller cover 30. The cover portion 30 extends beyond the length of the shade panel 22. A slot 32, provided in the roller cover 30, enables the shade panel 22 to be retracted thereinto and withdrawn therefrom.

Extending off of the outboard side of the roller cover 30, opposite the slot 32, is a storage compartment 34. The compartment 34 includes inboard and outboard side walls 38, 38' (the inboard side wall 38 being adjacent to or unitary with the outboard side of the roller cover 30), end walls 40, a bottom wall 42 and a top wall or lid 44. Together, these walls define an interior chamber 36 within the storage compartment 34. The top wall 44 is hinged with preferably spring biased hinges 46 at the outboard side wall 38' and this readily permits lifting of the top wall 44 and access into the interior chamber 36 of the storage compartment 34. Opposite the hinges 46, the top wall 44 is provided with a latch 48 that is operable to maintain the top wall 44 down and closed. Preferably, the storage container 34 is made of a rigid material, such as plastic, and sized to receive and store articles such as gloves, ice scrapers, flashlights, maps, emergency equipment, etc. . . .

Since the security shade 14 of the present invention is of the cross body variety, the outboard side wall 38' is formed with an attachment flange 25 to permit securing of the security shade 14, by fasteners 31 or other securement means, to the trim or other structure defining the inboard surface of the side wall 18. Such an attachment allows the security shade 14 to accommodate dimensional variations with the rear cargo area 12 while providing an aesthetically acceptable finished appearance.

In certain applications the shade 14 may need to accommodate a spare tire 50 mounted in the cargo area 12 and to one of the side walls 18. Previously, in order to accommodate a spare tire 50, the shade panel 22 of the security shade 14 was provided with a cutout conforming to the area occupied by the tire 50. Alternatively, the roller tube 24 and panel 22 were shortened to accommodate the tire 50 and the pull rod provided with an extendable end.

With the present invention, the storage compartment 34 provides for the inboard positioning of the roller tube 24 and panel 22 so as to locate these components laterally inboard of the tire 50. This eliminates the need for additional trimming or size changes to the various components including the shade panel 22 and roller tube 24. This therefore allows for the same roller tubes 24 and shade panels 22 to be used in a given vehicle, regardless of whether a spare tire 50 is mounted in the rear cargo area 12. Obviously this in turn generates a savings in terms of production and tooling costs.

Figure 4:
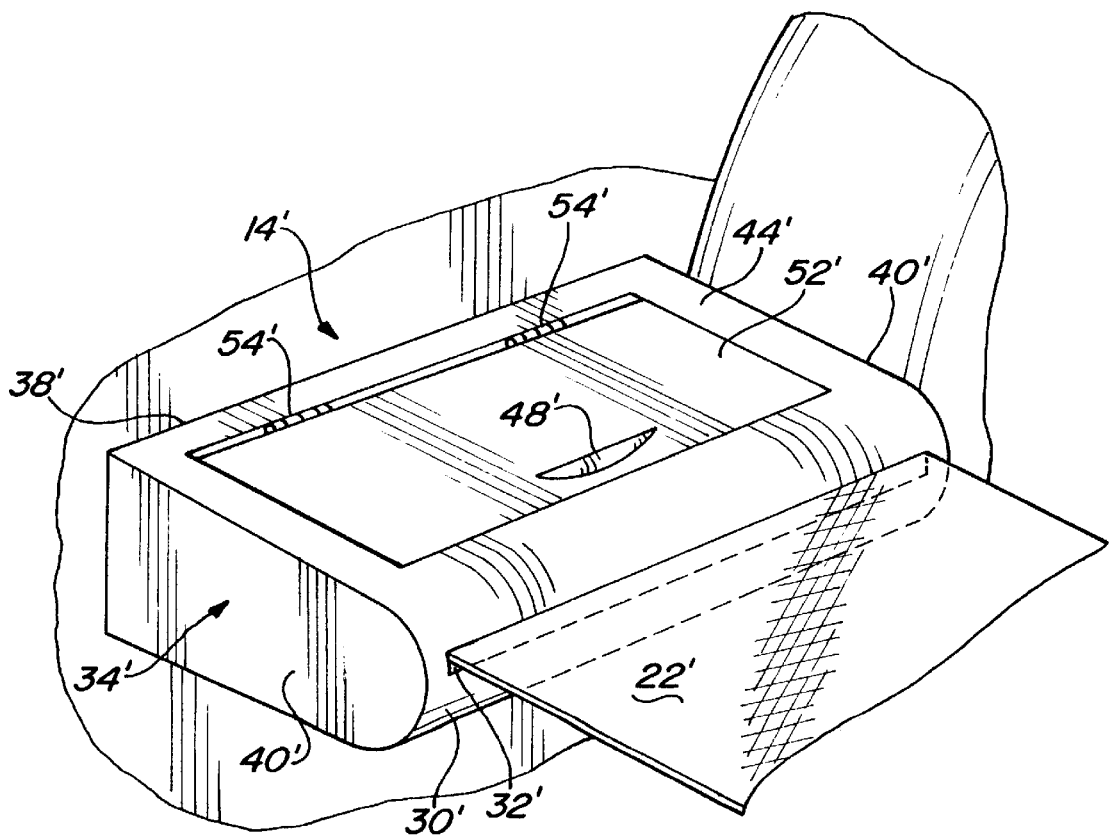
FIG. 4 is a perspective view of a second embodiment of a security shade according to the present invention.

A second embodiment of the present invention is shown in FIG. 4 is intended for use in vehicles with a spare tire 50 mounted in the cargo area 12. Since this second embodiment has numerous items in common with the first embodiment, like item numbers are being used where appropriate with "'" to each reference number to designate common elements.

The second embodiment differs from the first embodiment principally in that the storage container 34' is unitarily formed with the roller cover 30' and extends the full length of the shade panel 22' and roller tube 24. The outboard side wall 38' in this embodiment is used as the attaching mechanism for securing the shade 14' to the vehicle side wall 18 with the appropriate fasteners. As with the previous embodiment, the shade panel 22' is still withdrawn and retracted through a slot 32' in the cover 30'. Unlike the prior embodiment, a separate and independent lid 52' is provided in the top wall 44' with the lid hinging at 54' off of one side of the top wall 44'.

While the above description constitutes the preferred embodiment of the present invention, it will be appreciated that the invention is susceptible to modification, variation and change without departing from the proper scope and fair meaning of the accompanying claims.

I claim:

1. A security shade for a rear cargo area of a motor vehicle wherein said cargo area is bounded at its front by a passenger seat, at its sides by two opposing side walls, and at its rear by a rear access opening, said security shade comprising:

a roller tube;

a flexible shade panel wound onto said roller tube and having one end attached to said roller rube and adapted to be extensible towards one of the two opposing side walls to define a path of travel;

a cover portion covering at least a portion of said shade panel, said cover portion including portions defining a slot such that said shade panel is extendable and retractable through said slot;

a storage compartment integral with said cover portion and adapted to be mounted to the other of the two opposing side walls in the cargo area of the motor vehicle, said other side wall is perpendicular to the path of travel of said flexible shade panel, said storage compartment including side walls, ends walls, a bottom wall and a top wall all cooperating to define an internal chamber, said top wall being moveable between a closed position and an open position permitting access into said chamber; and one of said side walls of said storage compartment including a flange extending therefrom along the length thereof, said flange including a lip, and means for connecting said lip to the other sidewall of the motor vehicle.

2. The security shade of claim 1 wherein said cover portion has a length greater than then length of said one side wall of said storage comparment.

3. The security shade of claim 1 wherein said storage compartment extends less than the length of said slot.

4. The security shade of claim 1 wherein said cover portion extends beyond the length of said roller tube.

5. The security shade of claim 1 wherein said cover portion substantially encloses said roller tube and said shade panel.

6. The security shade of claim 1 wherein said cover portion and said storage compartment are unitarily formed.

7. The security shade of claim 1 further comprising biasing means for retracting said shade panel onto said roller tube and means for maintaining said shade panel in an extended position.

8. The security shade of claim 1 wherein said storage compartment is located opposite said slot.

9. The security shade of claim 1 wherein said storage compartment extends less than the length from the passenger seat to the rear access opening.

10. A security shade for a rear cargo area of a motor vehicle wherein said cargo area is bounded at its front by a passenger seat, at its sides by two opposing sidewalls, and at its rear by a rear access opening, and having a tire adjacent a first said sidewalls, said security shade comprising:

a roller tube;

a flexible shade panel having one end attached to said roller tube;

a cover member covering at least a portion of said shade panel;

an elongated storage compartment connected with said cover member between the first sidewall and said roller tube, said compartment having a surface adjacent to the first sidewall; and fastening means for anchoring said storage compartment surface to the first sidewall wherein said storage comparment has a length less than the distance between the passenger seat and the tire.

11. The security shade of claim 10 wherein said roller tube, flexible shade panel, and cover member each having a length less than the distance between the passenger seat and the tire.

12. A security shade for a rear cargo area of a motor vehicle wherein said cargo area is bounded at its front by a passenger seat, at its sides by two opposing sidewalls, and at its rear by a rear access opening, and having a tire extending from a first of said sidewalls, said security shade comprising:

a roller tube parallel to said sidewalls and extending substantially from said passenger seat to said rear access opening;

a flexible shade panel having one end attached to said roller tube;

a cover member covering at least a portion of said shade panel, said cover member located next to and without attachment to said tire;

a storage compartment connected to said cover member and located between said cover member and said first sidewall and between said passenger seat and said tire; and a fastener member adapted to attach said storage compartment to the first sidewall of the motor vehicle.

* * * * *

UNITED STATES PATENT AND TRADEMARK OFFICE
CERTIFICATE OF CORRECTION

PATENT NO. : 5,947,358
DATED : Sept. 7, 1999
INVENTOR(S) : Joseph Wieczorek

It is certified that error appears in the above-identified patent and that said Letters Patent is hereby corrected as shown below:

Col. 2, Line 29, please insert --shade-- after "pull".
Col. 5, line 5, after "than" delete "then" and insert --the--.
Col. 5, line 31, after "first" insert --of--.

Signed and Sealed this

Thirty-first Day of October, 2000

*Attest:*

Q. TODD DICKINSON

*Attesting Officer*  *Director of Patents and Trademarks*